United States Patent [19]

Carlson

[11] Patent Number: 4,706,797

[45] Date of Patent: Nov. 17, 1987

[54] APPLE ORIENTATION APPARATUS AND METHOD

[76] Inventor: Richard L. Carlson, 801 S. 30th Ave., Yakima, Wash. 98902

[21] Appl. No.: 838,542

[22] Filed: Mar. 11, 1986

[51] Int. Cl.[4] ............................................. B65G 47/24
[52] U.S. Cl. .................................... 198/394; 198/395; 198/468.6; 198/692; 198/375; 99/550
[58] Field of Search ............... 198/382, 383, 394, 395, 198/468.6, 692, 693, 375, 376, 379; 99/549, 550

[56] References Cited

U.S. PATENT DOCUMENTS

| | | |
|---|---|---|
| 2,254,594 | 9/1941 | Carroll ............................ 198/395 X |
| 2,609,942 | 9/1952 | Kofoid . |
| 3,016,076 | 1/1962 | Keesling . |
| 3,064,793 | 11/1962 | Ganze . |
| 3,156,277 | 11/1964 | Keesling . |
| 3,163,282 | 12/1964 | Shropshire et al. . |
| 3,314,463 | 4/1967 | Keesling . |
| 3,320,988 | 5/1967 | Armstrong et al. . |
| 3,448,845 | 10/1966 | Belk et al. ........................ 198/313 X |
| 3,602,281 | 8/1971 | Anderson et al. . |
| 3,620,274 | 11/1971 | Anderson . |

*Primary Examiner*—Joseph E. Valenza
*Assistant Examiner*—Cheryl L. Gastineau
*Attorney, Agent, or Firm*—Morris A. Case

[57] ABSTRACT

A first unit positions and then rotates an apple with a randomly oriented core. Rotation is stopped when any one of a series of aligned probes enters into one of the indents in the core of the apple. A second unit with axis of rotation at 90 degrees from the axis of rotation of the first unit takes and holds the positioned apple, and then rotates it. Rotation is stopped when a positioned probe enters into the indent in the core to align the core of the apple in the desired position to provide apple core alignment.

26 Claims, 12 Drawing Figures

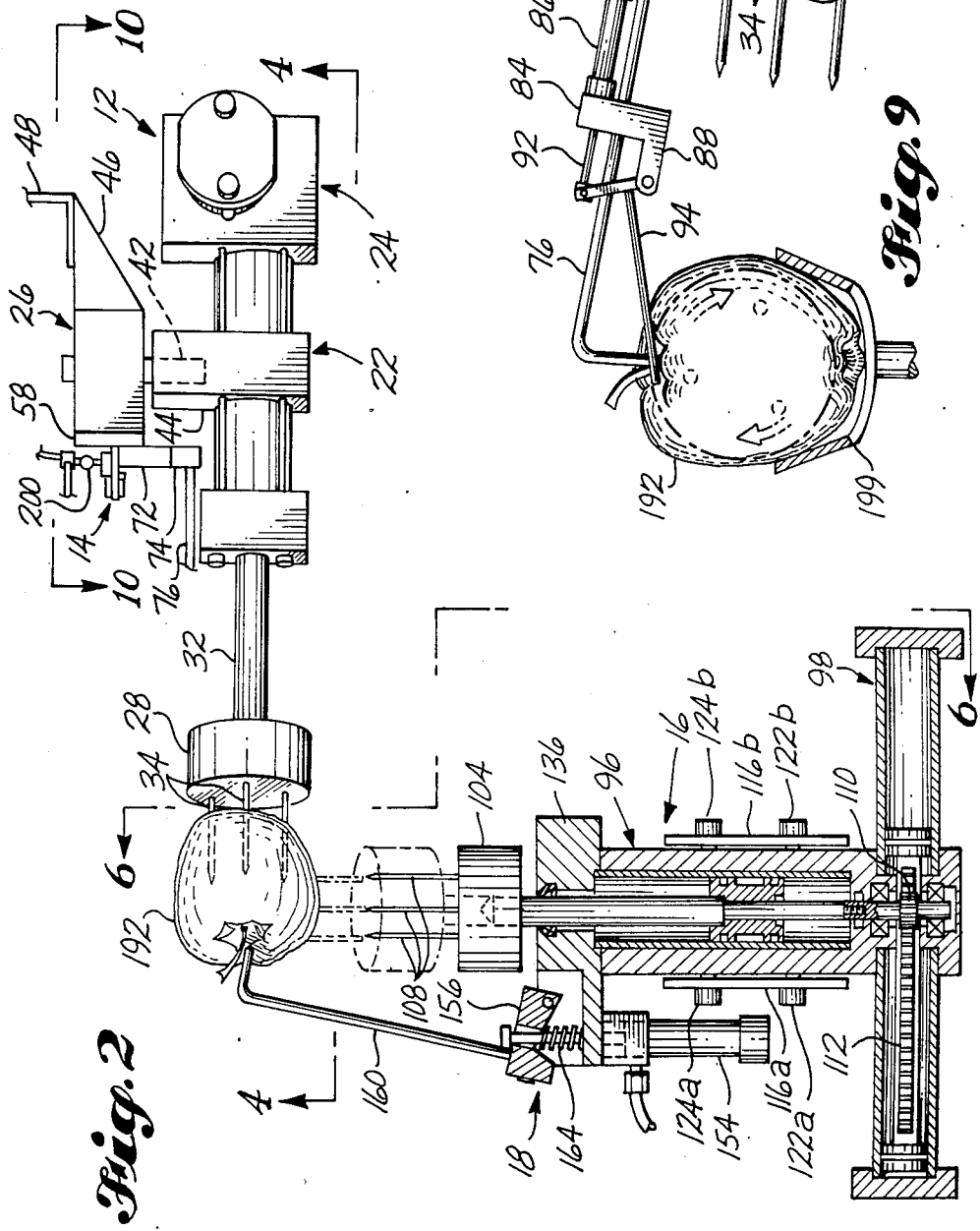

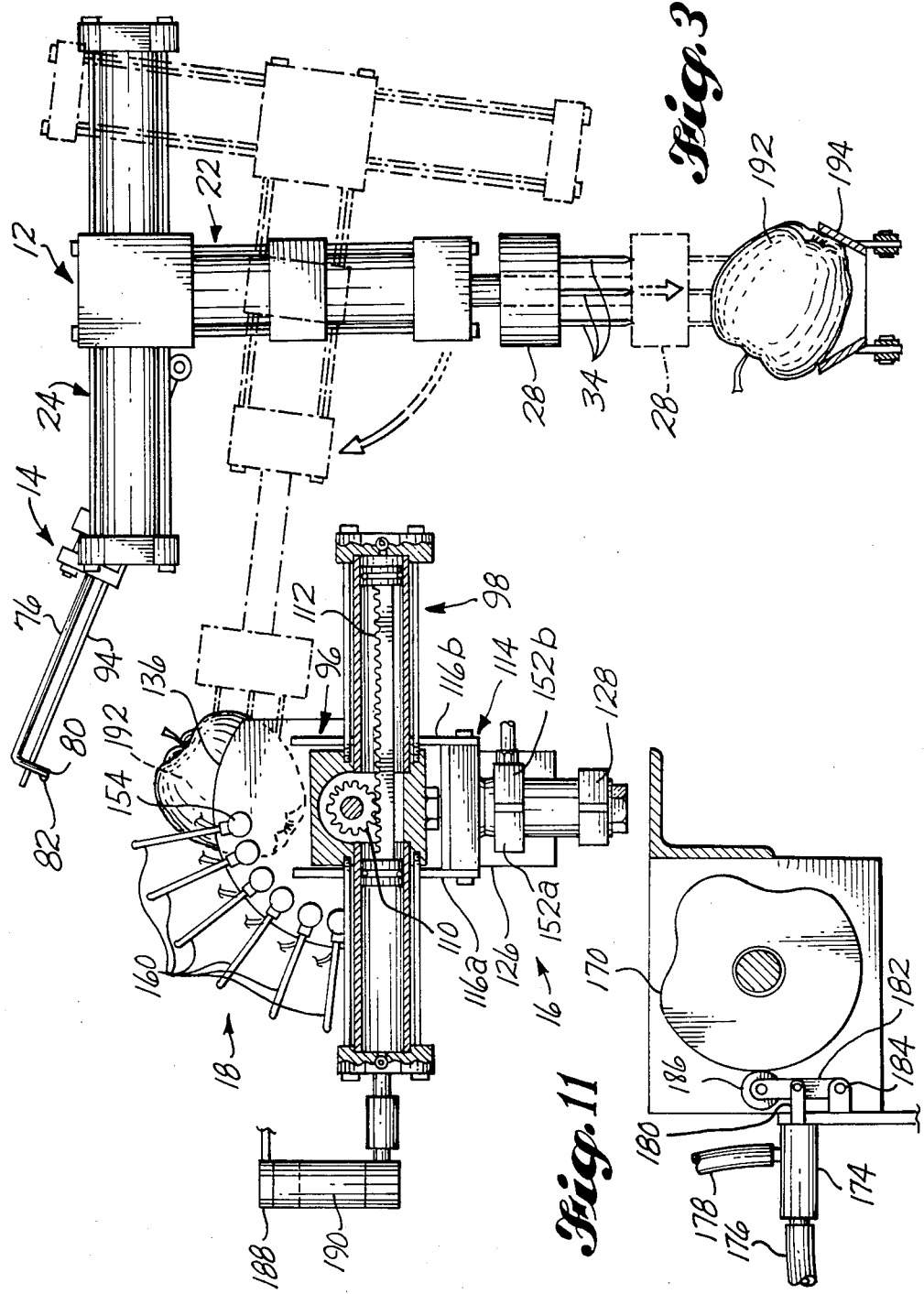

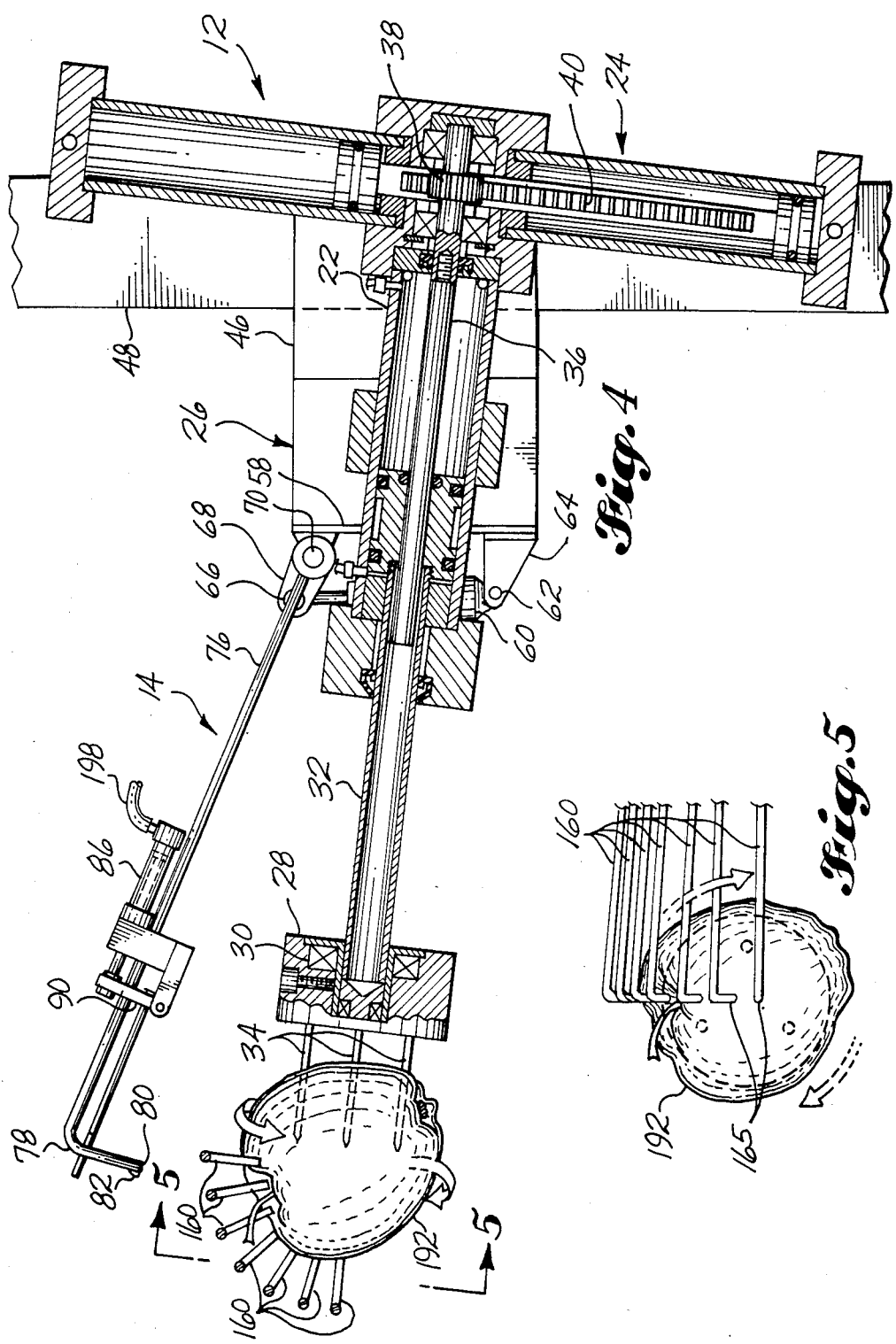

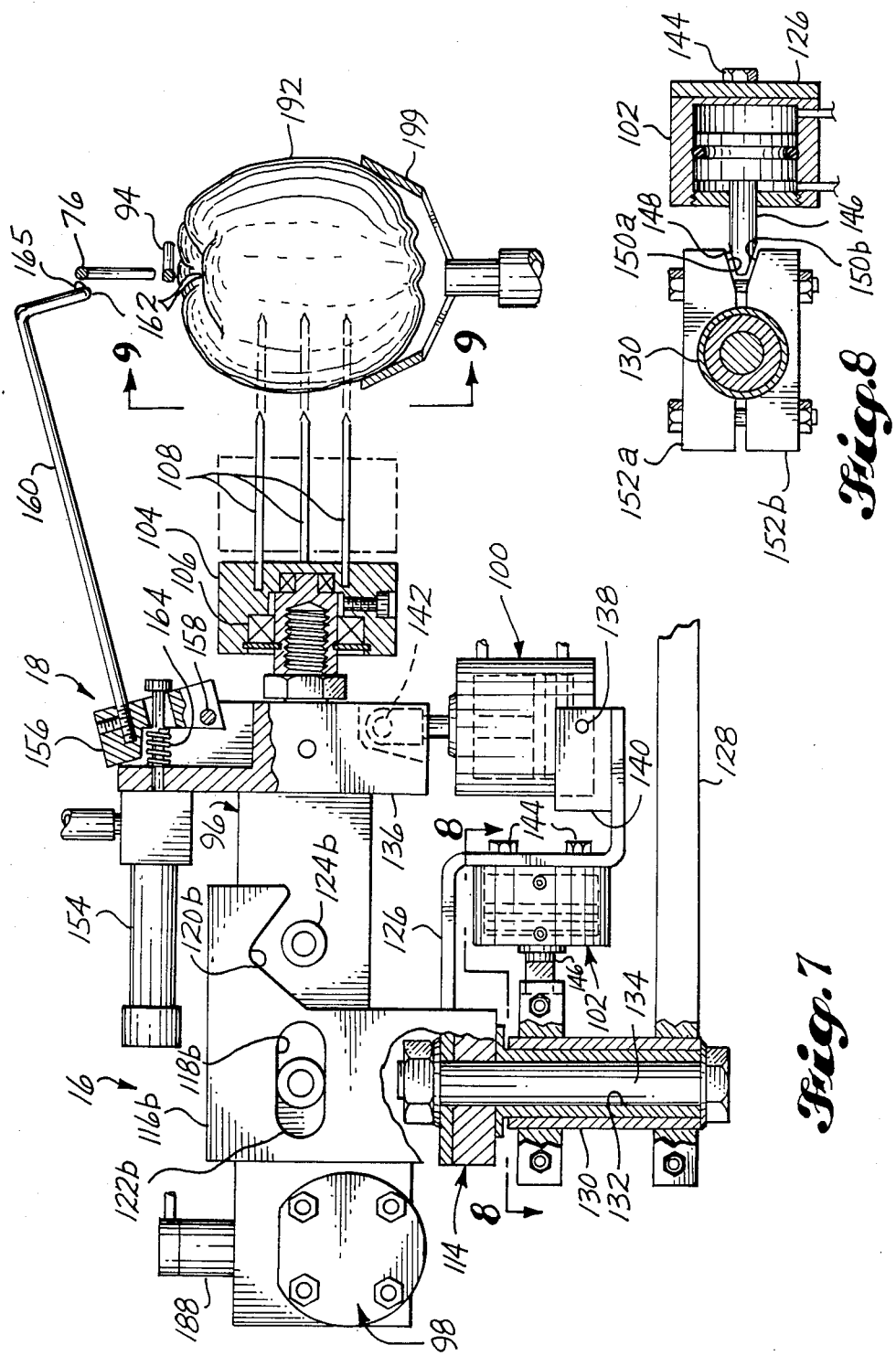

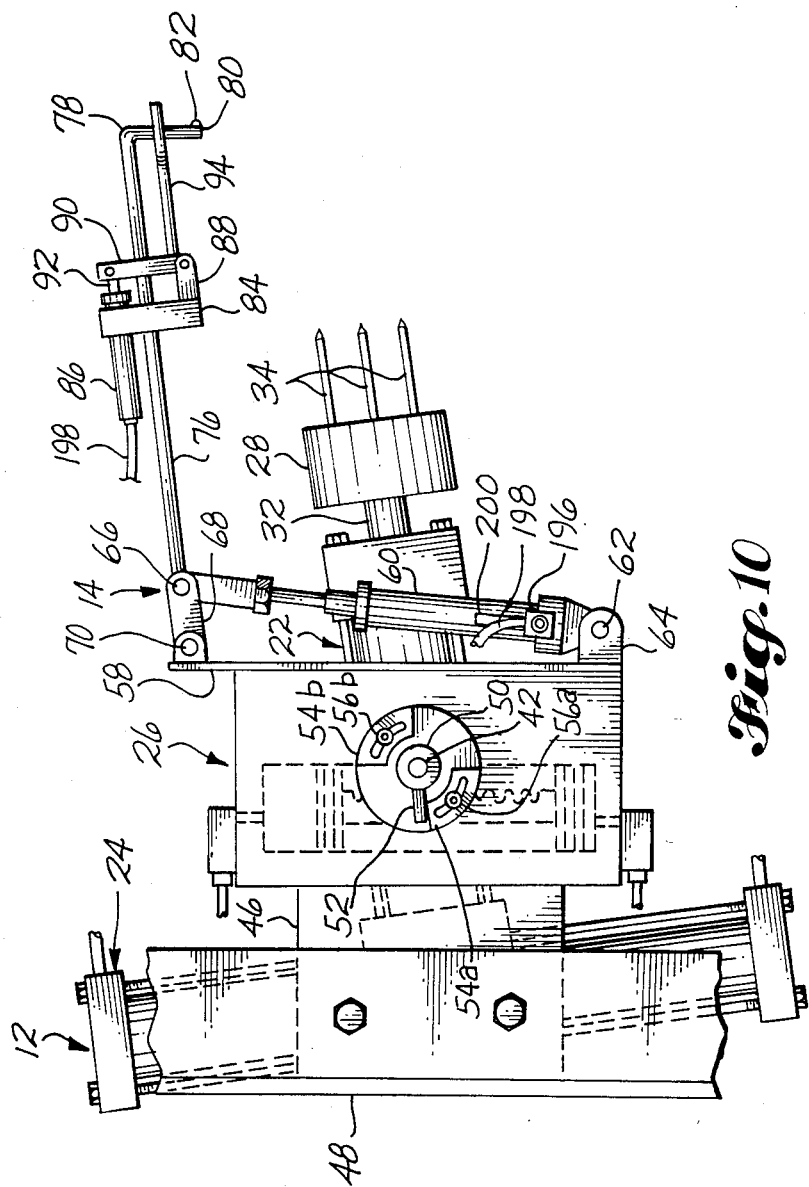

APPLE ORIENTATION APPARATUS AND METHOD

BACKGROUND OF THE INVENTION

There are numerous machines today that are used for automatically coring and peeling apples. These machines are fully automatic as to the coring and peeling, however, the axis of the core of the apple must be properly oriented when entering the machine. This has given considerable difficulty. Unfortunately, the most reliable method of orienting the apple for use in the machine is through the use of individuals who pick up the randomly oriented apples from a conveyor, orient the core and place the properly aligned apple on the machine for subsequent operation. This is a tedious job. It has been found that this job can be reliably accomplished with the machine of this invention.

SUMMARY OF THE INVENTION

An apple is rotated until rotation is stopped by a probe entering one of the indents in the axis of the core of the apple to align that apple core in a selected plane. The apple is then rotated with the core remaining in that plane until another probe enters the same indent to stop rotation with the axis of the apple core in the desired alignment.

It is an object of this invention to provide an apparatus to align the core of an apple.

DESCRIPTION OF THE DRAWINGS

FIG. 2, shows a plan view, partially in section, of the apple handling parts of this invention.

FIG. 3, shows a side elevational view, partially in section of the apple handling parts of FIG. 2.

FIG. 4, shows a view, partially in section, taken along line 4—4 of FIG. 2.

FIG. 5, shows a fragmented view taken along line 5—5 of FIG. 4.

FIG. 7, shows the same side elevational view as in FIG. 6, but in a different sequence.

FIG. 8, is a view taken along line 8—8 of FIG. 7.

FIG. 9, is a view taken along line 9—9 of FIG. 7.

FIG. 10, shows a view taken along line 10—10 of FIG. 2.

FIG. 11, shows a section taken along line 11—11 of FIG. 1.

DETAILED DESCRIPTION

Figure 1:
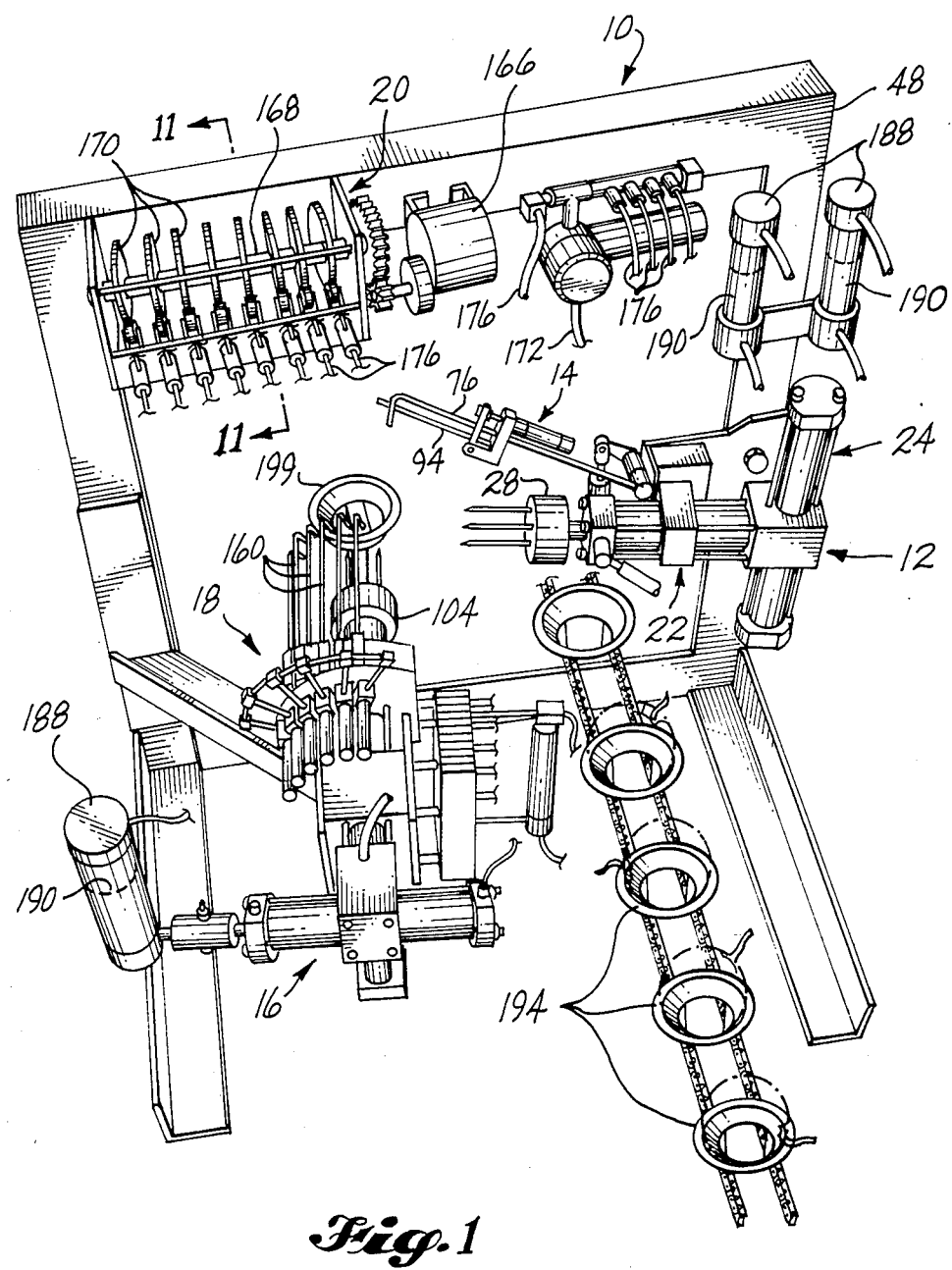
FIG. 1, shows a perspective view of the apple alignment apparatus of this invention.

An apple alignment apparatus 10, having a first apple handling unit 12, with a first apple aligning probe 14; a second apple handling unit 16, with a second apple aligning probe 18; and a timing unit 20.

The first apple handling unit 12, has an extension cylinder 22, a rotating cylinder 24, and a pivoting cylinder 26. The extension cylinder has a head 28, secured with a clutch 30, to the end of shaft 32. A set of three prongs 34, extend from the end of the head to allow for piercing and holding an apple. The shaft 32 is reciprocally movable along and is rotated by drive shaft 36. A pinion gear 38, mounted to the drive shaft, rotates that drive shaft when driven by moving rack 40. That rack is mounted within, and is actuated by rotating cylinder 24. The extension cylinder 22, is mounted to the pivoting cylinder 26. This is accomplished with a shaft 42 mounted within a support 44 located at about the midpoint of the extension cylinder. The shaft extends laterally from the extension cylinder and passes through the pivoting cylinder. That shaft is joined within the cylinder to a pinion gear. That pinion gear acts in conjunction with a rack, located within and controlled by the pivoting cylinder, to pivotably rotate the extension cylinder. The position of the extension cylinder at each end of the rotation is controlled. That control means is best shown in FIG. 10. In that Figure the pivoting cylinder is mounted to a support member 46; which in turn is mounted to structure 48 to secure the pivoting cylinder in place. A sleeve 50, with a radially extending pin 52 is secured to the end of shaft 42. Blocks 54a and 54b, are adjustably secured with screws 56a and 56b, to determine the end limit of the travel of the extension cylinder as it is pivoted.

The first apple aligning probe 14, as is best shown in FIGS. 2, 4 and 10, is mounted by a plate 58, to the side of the pivoting cylinder 26. The probe has a single acting cylinder 60 for raising the unit. The cylinder is pivotally mounted below at 62 to a support member 64; which in turn is joined to the plate. The end of the shaft on the cylinder is pivotally mounted above at 66 to a linkage 68; which in turn is joined to a shaft 70. That shaft is supported by tube 72; which is joined to the plate 58. The shaft extends beyond the tube where it is joined at 74 to a radially extending rod 76. That rod extends for a distance, turns downward at 78 and terminates at 80 where it acts as a finger of a probe. Adjacent the end of the probe, there is preferably a small sharp laterally extending projection 82. Mounted part way out on the rod 76, there is a release unit with support member 84. On the upper part of the support member there is a parallel mounted single acting cylinder 86. On the lower part of the support member there is a forward extending projection 88. A linkage 90 is pivotally mounted at the bottom to the projection and pivotally mounted at the top to the end of the shaft 92; which is controlled by the cylinder 86. A second rod 94 is joined to the linkage and extends forward toward, then bypasses adjacent, the downturned part of rod 76.

The second apple handling unit 16, has an extension cylinder 96, a rotating cylinder 98, a raising cylinder 100, and a locking cylinder 102.

The extension cylinder 96, and the rotating cylinder 98, are similar to and work in the same manner as the first extension cylinder 22 and the first rotating cylinder 24. This extension cylinder 96 has a head 104 with a clutch 106, and forward extending prongs 108. The head is rotated by use of a pinion gear 110 that is driven by rack 112; which is actuated by the rotating cylinder.

The extension cylinder, with attached rotating cylinder, is mounted to a bracket 114. That bracket has a pair of vertical support members 116a and 116b, that are located alongside the extension cylinder. The vertical support members each have a pair of matching horizontally extending slots 118a and 118b, and a pair of inverted V shaped recesses 120a and 120b. The extension cylinder in turn has outwardly extending circular projections 122a and 122b to fit into and allow movement within the horizontal slots, and outwardly extending circular projections 124a and 124b located to move up to and be held by the inverted recesses. The vertical support members are joined to a flat contoured brace 126. The bracket has a base 128; which in turn is secured to a support structure not shown. A cylindrical shaped housing 130 is rigidly joined to and extends upward from the base. The joined support members and brace are pivotally secured to the base with tubing 132 and fastener 134.

Figure 6:
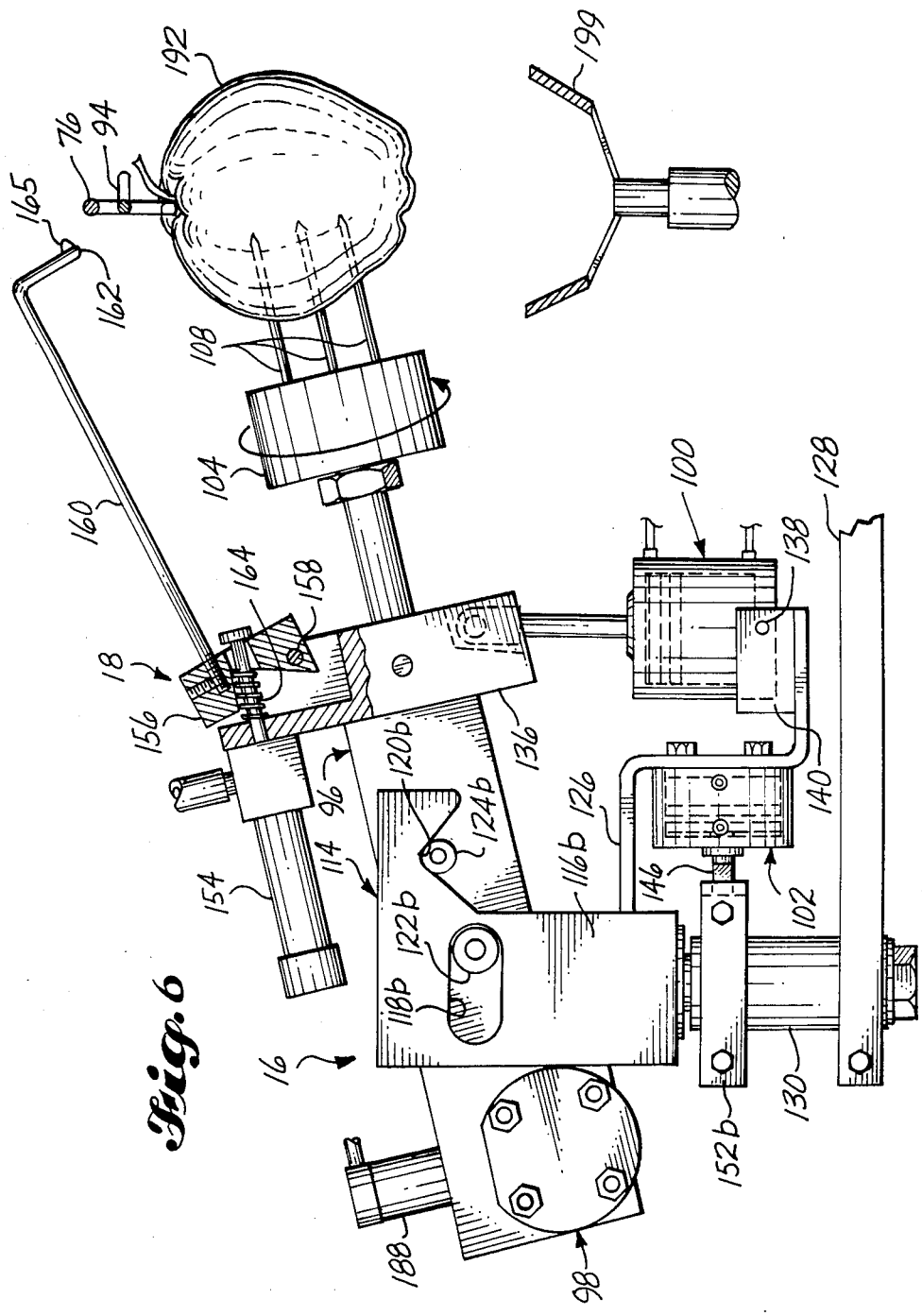
FIG. 6, shows a side elevational view taken along line 6—6 of FIG. 2.
Figure 12:
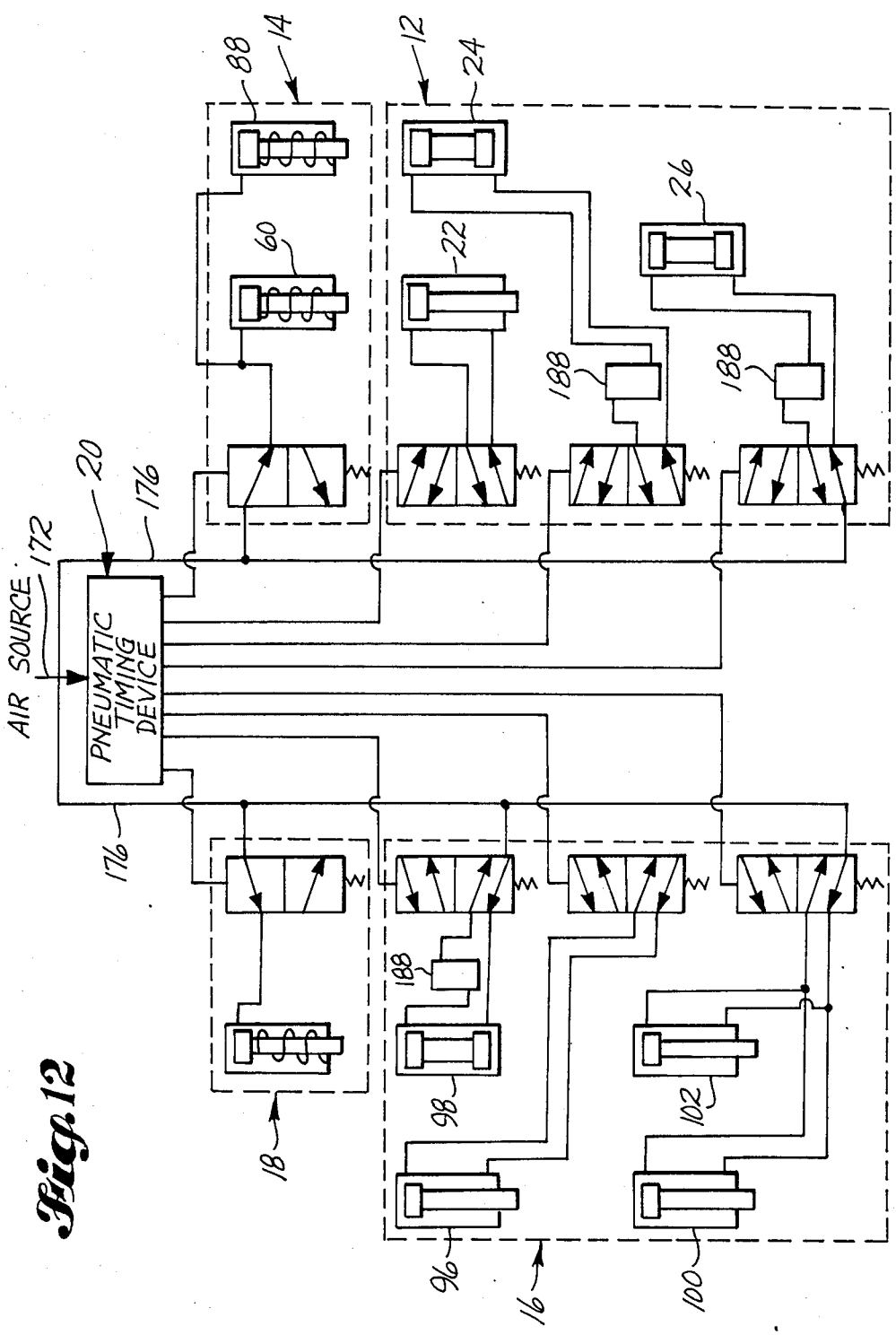
FIG. 12, shows a schematic of the timing device and the apparatus for this invention.

The extension cylinder 96, has a laterally extending projection 136. The raising cylinder 100, as best shown in FIGS. 6 and 7, is mounted to operate between the brace 126 and the projection 136. To accomplish this it is pivotally mounted at 138 to a bracket 140; which in turn is mounted to the brace. At the upper end of the raising cylinder the shaft is pivotally mounted at 142 to the underside of the projection 136.

The locking cylinder 102, as is best shown in FIGS. 6 through 8, is mounted to brace 126 with bolts 144. The actuating shaft 146 is directed toward cylindrical shaped housing 130, and is tapered at 148 adjacent the end to move against surfaces 150a and 150b formed by the ends of a pair of brackets 152a and 152b; which are mounted to the cylindrical shaped housing 130. See FIG. 8.

The second apple aligning probe 18, consists of a number of units each having an actuating cylinder 154 mounted to the projection 136 of the extension cylinder. Each unit also has a movable member 156 pivotally mounted at 158 to the projection. Each movable member has a rod 160 secured thereto. That rod extends forward then turns to be directed radially inward toward an apple being held for alignment. The directed end 162, of each rod acts as a finger or probe. Each movable member has a spring 164; which continually urges the finger toward the apple; except when the member is retracted by the cylinder. When the fingers are resiliently extended to contact the apple, the plurality of contact end points 162 covers about 90 degrees around the arc of the apple and the ends are all located on a plane which is located along the axis of the first extension cylinder when positioned for alignment. Preferably each finger has a sharp laterally extending projection 165.

The timing unit 20 consists of a drive unit 166; which drives a shaft 168, upon which is mounted a series of shaped cams 170. The cams are shaped by varying the outer periphery and the cams are arranged to each provide individual timing. In a preferred embodiment the cams are used to sequence and to control the turning on and off of inlet air 172, and used to automatically control the apple alignment operation. In those units, as is best shown in FIG. 11, a valve 174 has compressed air inlet line 176 and outlet line 178. Movement of rod 180 opens or closes the valve. To accomplish this linkage 182 is pivotally mounted to a support at 184. A roller member 186 is rotatably mounted to the other end of the linkage. That roller member rolls against the shaped cam to shut off the valve according to the timing and the shape of the cam. It is also preferred to use a fluid to actuate the rotating cylinders at the time the head of a extension cylinder and or the pivoting cylinder is being actuated. This is accomplished by use of a vertically positioned container 188; which is best shown in FIGS. 1 and 3. A fluid 190 is placed in the container to fill the line leading into the cylinder and to partially fill the container.

In operation an apple 192 is located on a cup 194, or the apples may simply be on a conveyor and positioned to advance to the position for pickup. The air is turned on, air introduced into line 176 and the timing unit 20 turned on. The pivoting cylinder 26 is actuated to pivot the extension cylinder 22 downward toward the apple. Next the extension cylinder is extended so that the prongs 34 pierce the apple. The cylinder head is retracted, the cylinder rotated to alignment position, and the head with apple again extended. During this time the raising cylinder 100 and the locking cylinder 102 have been actuated to raise the extension cylinder into apple alignment position. In this alignment position the axis of the two alignment cylinders are at 90 degrees to each other. At this time the head 104 is retracted, and air is introduced into both aligning probes 14 and 18; so that the fingers of all the probes are kept raised and away from the apple. The timer unit then removes air from probe 18 and the springs 164 bring the fingers of that probe resiliently against the positioned apple. Rotating cylinder 24 is then actuated which rotates the apple. When any one of the fingers 162 drop into an indent, at either end of the core of the apple, the combination of that finger position and the clutch 28 stops further rotation of the apple; which now is aligned in the plane of the axis of extension cylinder 22. Head 104 is advanced and probes 108 pierce the apple, at which time probe fingers 162 are retracted. At the same time head 28 is retracted. Next, the air is removed from probe 14 and that probe drops down with end 80 pressing against the apple. Then rotating cylinder 98, rotates the apple until the probe drops into the indent of the apple at which time clutch 106 prevents further rotation and the apple core is now aligned vertically. Air is then introduced into probe 14. When this air is introduced it enters at 196, passes immediately through line 198 to actuate cylinder 86 and press shaft 94 down against the apple. At the same time raising cylinder 100 and locking cylinder 102 are activated to lower the apple into cup 102. Time delay unit 200 then lets air pass into cylinder 60, and the probe and shaft are raised from the apple. The aligned apple is then moved by a method, not shown for further treatment.

I claim:

1. An apple alignment apparatus comprising: a pivotally mounted cylinder having a reciprocally movable head with clutch and with outwardly extending prongs for piercing and holding an apple, means for pivoting the cylinder between apple pickup and apple positioned location, means for rotating the positioned apple, a probe having aligned multi fingers to resiliently contact the positioned apple and stop apple rotation by one of the fingers entering an apple core indent, a second pivotally mounted cylinder located at 90 degrees with respect to the first cylinder and having a reciprocally mounted head with clutch and with outwardly extending prongs for piercing and holding the positioned apple, means for rotating the newly held positioned apple, a second single finger probe to resiliently contact the positioned apple and stop apple rotation when it enters the apple core indent to align the core of the apple, and means for placing the aligned apple onto a holder for further processing.

2. An apple alignment apparatus as in claim 1, further comprising: a sharp laterally extending short projection adjacent each of the ends of the probes.

3. An apple alignment apparatus as in claim 1, further comprising: a pivotally mounted rod alongside the second probe, and means for pressing the rod against the top of the aligned apple to assist in maintaining apple alignment when placing the aligned apple in the holder.

4. An apple alignment apparatus as in claim 1, with the apparatus further comprising: means for automatically sequencing and operating the alignment apparatus.

5. An apple alignment apparatus as in claim 4, with the apparatus further comprising: a pivotally mounted rod alongside the second probe, and means for pressing the rod against the top of the aligned apple to assist in maintaining apple alignment when placing the aligned apple in the holder.

6. An apple alignment apparatus as in claim 5, with the apparatus further comprising: a sharp laterally extending short projection adjacent each of the fingers of the probe.

7. An apple alignment apparatus as in claim 4, wherein the means for automatically sequencing and operating the alignment operation includes: pneumatic means for operating the equipment, and a pneumatic timing device for controlling the operation.

8. An apple alignment apparatus as in claim 7, wherein the means for rotating a positioned apple includes fluid means introduced into the pneumatic system to provide means for accurate control when rotating the positioned apple.

9. An apple alignment apparatus as in claim 1, wherein the means for placing the aligned apple onto a holder includes means to permit limited peripheral movement.

10. An apple alignment apparatus comprising: a pair of apple handling units directed at 90 degrees with respect to each other; the first unit having means for picking up a randomly oriented apple, extending the apple in front of the second unit, and rotating the apple; a multi fingered probe means above the second unit and having means for contacting the apple and for stopping rotation by the first unit; the second unit having means for taking the extended apple and rotating that apple, and means for moving an aligned apple onto a cup for further treatment; and a fingered probe mounted above the first unit and having means for contacting the partially aligned apple and for stopping rotation by the second unit thereby placing the apple in proper alignment before the second unit places it onto the cup for further treatment.

11. An apple alignment apparatus as in claim 10, wherein the first unit means for picking up a randomly oriented apple, extending the apple in front of the second unit, and rotating the apple comprises: a cylinder actuated reciprocating head having prongs on the end for piercing an apple, means for pivoting the cylinder between apple pick up and apple processing position, means for rotating the head, and clutch means within the head.

12. An apple alignment apparatus as in claim 11, wherein the multi fingered probe means comprises: a number of closely spaced apart probe fingers directed radially inward with respect to a positioned apple, means for resiliently holding the fingers against the apple to allow one of the fingers to move into an apple core indent to stop rotation of the apple, and means for moving the fingers away from the apple.

13. An apple alignment apparatus as in claim 12, wherein the second unit means for taking and rotating the apple comprises: a cylinder actuated reciprocating head having prongs on the end for piercing an apple, means for rotating the head, and clutch means within the head.

14. An apple alignment apparatus as in claim 13, wherein the means for moving an aligned apple onto a cup for further treatment comprises: a pivotable mounting for the second unit, a pivotably mounted cylinder located to move the second unit between the apple aligned position and the apple in the cup position, means for holding the second unit rigid when in the apple aligned position, and means to allow limited peripheral movement when the second unit is lowering the apple onto the cup.

15. An apple alignment apparatus as in claim 14, wherein the fingered probe means comprises: a probe finger directed vertically downward and radially inward with respect to the positioned apple, means for resiliently holding the probe against the apple to enter the apple indent to prevent further rotation and align the core of the apple vertically, and means for moving the probe away from the aligned apple.

16. An apple alignment apparatus as in claim 15, further comprising: an arm extending alongside the fingered probe with that arm having means to press against the aligned apple until the probe finger means moves away.

17. An apple alignment apparatus as in claim 16, with the probe further comprising a short sharp projection extending laterally adjacent the end of the probe.

18. An apple alignment apparatus comprising: a first pivotally mounted actuating cylinder, a head having outwardly extending piercing prongs mounted to be actuated by the cylinder, means for rotating the head, a clutch mounted in the head, a second cylinder axially aligned at 90 degrees with respect to the axis of the first cylinder, a second head having outwardly extending piercing prongs mounted to the second cylinder, means for rotating that head, a clutch mounted in that head, means for pivoting the first cylinder with head to a position for picking up a randomly aligned apple, means for lowering the second cylinder with head to a position for placing an aligned apple in a cup, a plurality of probes located along a line which is an extension of an axis of the first cylinder and head with each probe directed radially inward with respect to an apple held by the prongs of that head, means for resiliently pressing the multiple probes against the held apple to drop one of the probes into one of the indents of a core of the apple and stop apple rotation, means for moving the probes away from the apple, a single probe vertically mounted to extend radially inward with respect to an apple held by the prongs of the second head, means for resiliently pressing that single probe against the held apple to drop into the apple indent stop apple rotation and align the core of the apple.

19. An apple alignment apparatus as in claim 18, further comprising: an arm extending alongside the single probe, means for holding that arm against the aligned apple, and means for moving the arm away from the apple.

20. An apple alignment apparatus as in claim 19, further comprising: a short sharp laterally extending projection adjacent the end of each probe.

21. An apple alignment apparatus as in claim 19 further comprising: means for automatically sequencing operation of the apparatus.

22. A method of aligning the core of an apple with steps comprising: piercing picking up and holding a randomly aligned apple, positioning and then rotating the positioned apple, stopping the rotation with the axis of the core of the apple aligned in a plane located by the holders axis of rotation, piercing and holding the apple from a direction at 90 degrees to the plane, retracting the first piercing holder, rotating then stopping rotation with the axis of the core of the apple aligned in a predetermined direction within the plane, and transfering the aligned apple onto a holder.

23. A method of aligning the axis of an apple as in claim 22 with steps further comprising: utilizing a plurality of resilient probes, and locating those probes on a plane for dropping into an apple core indent and stopping apple rotation with the core aligned in that plane.

24. A method of aligning the axis of a core of an apple as in claim 23 with steps further comprising: a probe directed radially inward toward the apple along the line desired for final apple alignment.

25. A method of aligning the axis of a core of an apple as in claim 24 with steps further comprising: resiliently holding a rod against the aligned apple while tranferring the apple onto the holder.

26. A method of aligning the axis of a core of an apple as in claim 25 with steps further comprising: providing a sharp short laterally extending projection alongside the contact end of each probe.

* * * * *